E. Hosford,
Magazine Stove.

No. 76,455.  Patented Apr. 7, 1868.

Witnesses;
W. Jay Ketcham
Albert R. Swett

Inventor,
Elihu Hosford
by Prindle & Co
att'ys

3 Sheets. Sheet 3.

E. Hosford,
Magazine Stove.

No. 76,455. Patented Apr. 7, 1868.

Witnesses:
C. E. Lemele
J. R. Hopkins

Inventor:
Elihu Hosford
by Prindle & Co.
Att'ys

United States Patent Office.

ELIHU HOSFORD, OF CHICAGO, ILLINOIS.

*Letters Patent No. 76,455, dated April 7, 1868.*

IMPROVEMENT IN COAL-STOVES.

*The Schedule referred to in these Letters Patent and making part of the same.*

TO ALL WHOM IT MAY CONCERN:

Be it known that I, ELIHU HOSFORD, of Chicago, in the county of Cook, and in the State of Illinois, have invented an Improved Stove for Burning Coal, and consuming all gas arising therefrom; and do hereby declare that the following is a full, clear, and exact description thereof, reference being had to the accompanying drawings making a part of this specification, in which—

Letters of like name refer to like parts in each of the figures.

Figure 1:
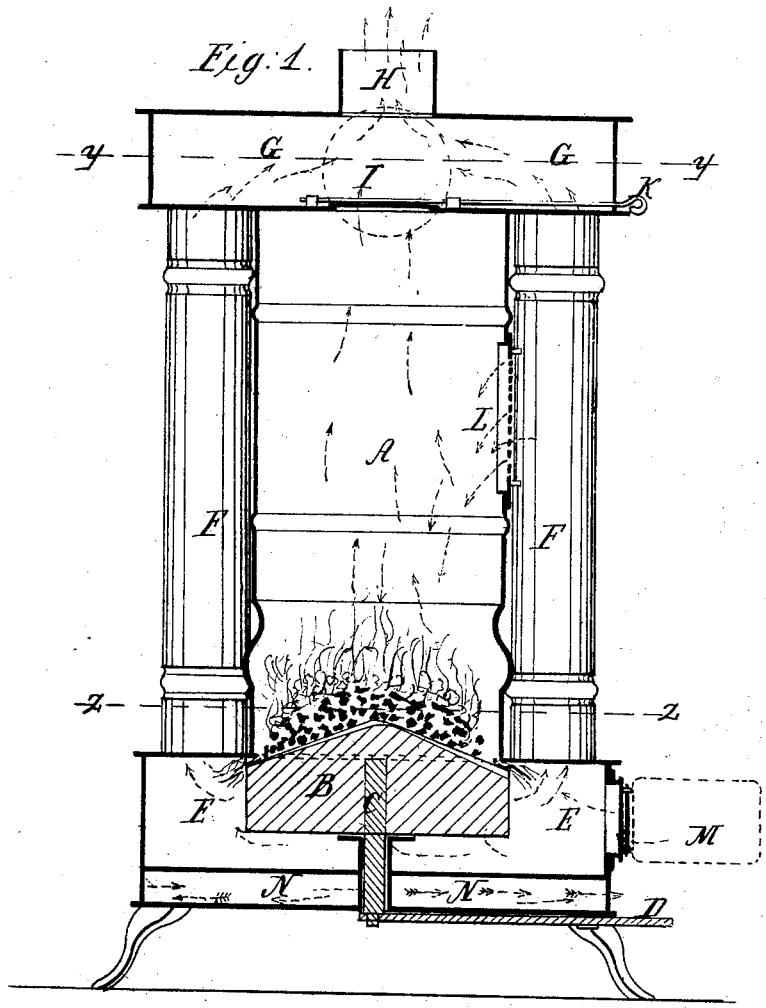
Figure 1 is a vertical section of figs. 2, 3, 4, and 5, at the intersection of the red line $x\ x$.
Figure 2:
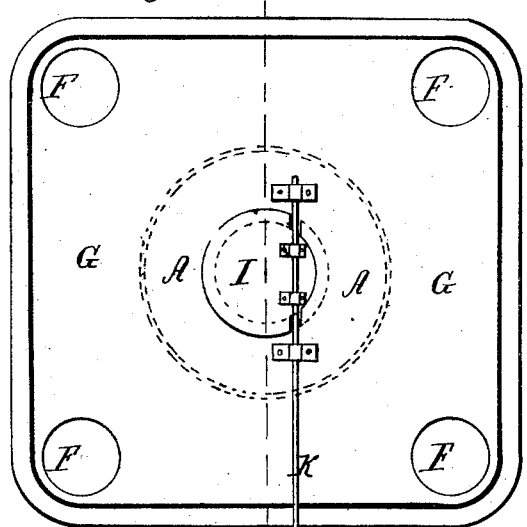
Figure 2 is a cross-section of fig. 1 at the intersection of the red line $y\ y$.
Figure 3:
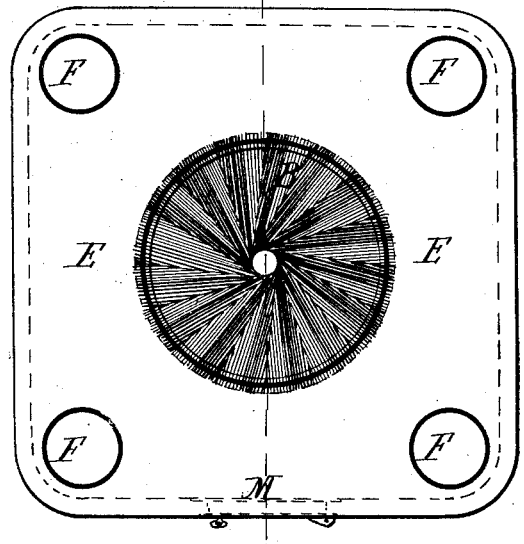
Figure 3 is a cross-section of fig. 1 at the intersection of the red line $z\ z$.
Figure 4:
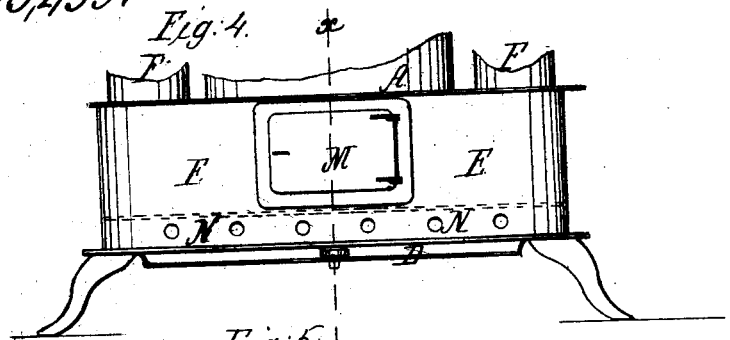
Figure 4 is a front elevation of the base.
Figure 5:
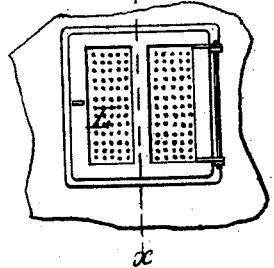
Figure 5 is a view of the feed and draught-door.
Figure 6:
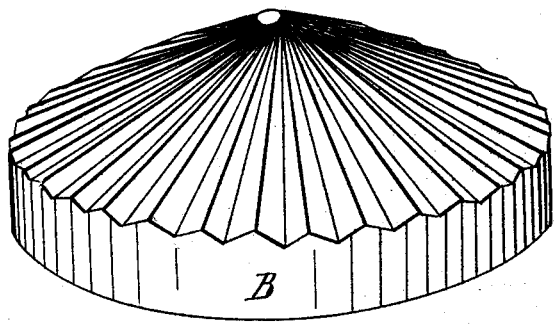
Figure 6 is a perspective view of the grate.

The nature of my invention consists in a method for consuming the smoke and gas given off from burning coal, by forcing them downward through the entire length of the fire-pot, and then upward through hollow columns into the hot-air chamber and smoke-flue, for which purpose the stove described below is designed.

In the annexed drawings, A represents the cylinder, constructed in the usual manner, B represents the grate, made of iron, soapstone, or other material, being a short cylinder, with a conical top, corrugated or grooved to admit of the passage of air, and allow the ashes and refuse to fall into the ash-pit, E. C is a pivot upon which the grate B turns, passing downward through the bottom of the stove when the handle D is attached, by the use of which the grate B is rotated, causing the ashes to fall into the ash-box E, to which access is had through the door M. F F are hollow columns or pipes, connecting the ash-box E with the hot-air chamber G, and smoke-flue H. I is a damper, operated by the rod K, which when closed cuts off direct communication between the cylinder A and hot-air chamber G. L is the feed and draught-door. H is an air-space, formed by a double bottom, through which the air circulates freely, being admitted by openings in the sides, to protect the floor from heat.

The operation of this stove is very simple. To start a fire, the damper I and door M are opened, causing a draught from below the grate B, through the cylinder A and hot-air chamber G, into the smoke-flue H, as indicated by the blue arrows, and the coal ignited in the usual manner. After the fire is well started, fresh coal is supplied, and the damper I and door M closed, reversing the draught and causing it to pass downward through the fire-pot into the ash-box E, and upwards through the columns F F and hot-air chamber G, into the smoke-flue H, as shown by the red arrows, whereby the smoke and gas are entirely consumed.

The advantages possessed by my stove over all others in use are, first, the gas and smoke are entirely consumed, whereby the heating properties of the coal are increased from forty to sixty per cent., and a proportionate amount of fuel and cost saved; second, the heat from the fire being carried downward into the base of the stove, the lower part of the room is warmed in a more thorough manner; third, the grate is stronger, more durable, and better adapted to the purpose required than any other; fourth, the direct draught from the ash-box carries into the chimney all dust that would otherwise come into the room and cause much annoyance while the ashes are being shaken down; fifth, the radiating-surface is much larger than that of other stoves of like bulk, enabling it to warm a larger room; it is more simple, easy of construction, and can be produced at less cost.

Having thus fully described my improvement, what I claim as my invention, and desire to secure by Letters Patent, is—

The grate B or its equivalent, for the purpose and substantially as herein described.

I also claim the combination of the cylinder A, grate B, ash-box E, air-space H, columns F F, and hot-air chamber G, for the purpose and substantially as herein set forth.

In testimony that I claim the foregoing, I have hereunto set my hand, this 11th day of February, 1868.

ELIHU HOSFORD.

Witnesses:
LUTHER B. FRY,
LOUIS H. HOLMES.